United States Patent
Ouellet et al.

(10) Patent No.: US 6,854,031 B1
(45) Date of Patent: *Feb. 8, 2005

(54) CONFIGURABLE SERIAL INTERCONNECTION

(75) Inventors: Jean-Yves Ouellet, Ottawa (CA); Leonid Goldin, Nepean (CA)

(73) Assignee: Cisco Technology, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/600,020

(22) Filed: Jun. 20, 2003

Related U.S. Application Data

(63) Continuation of application No. 09/494,569, filed on Jan. 31, 2000, now Pat. No. 6,584,535.

(51) Int. Cl.[7] .............................................. G06F 13/14
(52) U.S. Cl. ........................ 710/305; 709/234; 709/235
(58) Field of Search ................................ 710/100, 305; 709/234, 235

(56) References Cited

U.S. PATENT DOCUMENTS

| | | | | |
|---|---|---|---|---|
| 4,663,706 A | * | 5/1987 | Allen et al. | 709/234 |
| 4,667,287 A | * | 5/1987 | Allen et al. | 709/234 |
| 5,020,020 A | * | 5/1991 | Pomfret et al. | 709/235 |
| 5,930,016 A | * | 7/1999 | Brorson et al. | 398/79 |
| 6,233,704 B1 | * | 5/2001 | Scott et al. | 714/717 |

* cited by examiner

*Primary Examiner*—Tim Vo
(74) *Attorney, Agent, or Firm*—Hamilton, Brook, Smith & Reynolds, P.C.

(57) ABSTRACT

A configurable interconnect for use with high-speed electronic system components. The interconnect uses a light-weight protocol with control characters embedded into the data stream. The control characters define events such as end of packet, end of packet with error, transmit on, transmit off, synchronizing codes, and pass-through status. In one described embodiment, the protocol is used in an internet-working device node in which a pair of high-speed counter rotating rings transport data packets. The high-speed interconnect permits data packets to pass through the node without the delays which might otherwise be experienced with time division multiplex bus structures and the like.

35 Claims, 11 Drawing Sheets

CONFIGURABLE SERIAL INTERCONNECTION

RELATED APPLICATION

This application is a continuation of U.S. application Ser. No. 09/494,569, filed Jan. 31, 2000 now U.S. Pat. No. 6,584,535. The entire teachings of the above application are incorporated herein by reference.

BACKGROUND OF THE INVENTION

From personal computers to file servers to internetwork equipment, the need for high operational data rates continually drives system level architecture decisions in data processing systems. Designers are typically no longer concerned with optimization at the circuit level or even at the processor level, since most systems are now implemented using standardized chip sets. Thus, overall system performance often can be optimized only by careful consideration of the architecture chosen for interprocessor communication.

Historically, such systems have been based upon a bus topology to which access is granted on a time slot basis. This architecture has worked well in personal computers and other data processors wherein input/output (I/O) devices share access to the bus with memory subsystems on a time slot basis. Because the number of time slots on a bus are fixed in advance, once all such slots are allocated among the various elements, there is little room for additional expansion. Thus, a bus oriented time slot architecture does not scale well in many applications. In addition, any attached devices must arbitrate for bus access. If any device tends to "hog" the bus, the contention for access between devices negatively impacts the performance of all devices.

Configuration of a time slot oriented system also tends to be an art rather than a science, since the determination of which specific slot is used for which specific device can also determine system performance. Often, only with detailed experience with a particular architecture can the system be tuned for optimum performance. And, configuration of such systems becomes increasingly difficult as bus clock rates increase. Depending on their implementation, maximizing the clock rate of such high-speed time division multiplexed access buses require that the parallel bus slots be physically close to each other. Otherwise, high clocking rates may result in clock skew, causing data errors to occur.

Perhaps nowhere is the demand for increased processor performance more acute at the present time than for internetwork devices. Such devices include routers, switches, and other processors for handling Internet Protocol (IP) type data traffic through a network. The demand for high-speed Internet infrastructure continues to escalate. For example, traffic on Internet backbones doubles approximately every six to nine months. The widespread adoption of internets and extranets also continues to bring further changes to the IP service infrastructure.

In most existing high-speed internetwork devices, optical physical layer signalling technology is used to interconnect devices such as switches and routers. These devices may be directly connected with optical fiber, or may be connected to an optical network that provides wavelength routing between various devices. In either case, the switches and routers use the full bandwith capacity provided by the fiber or wavelengths to statistically multiplex packets or cells, allowing what has heretofore been thought to be an efficient use of the traffic handling capacity.

However, these designs date back to a time when data traffic represented only a small fraction of the total traffic on public networks, when the strategy of carrying data over a voice circuit oriented infrastructure was cost effective and imposed few constraints. This infrastructure typically consisted of voice switches interconnected by time division multiplexing (TDM) or circuit switched networking equipment. The TDM network has been built out using digital cross-connects and network elements such as Synchronous Optical Network/Synchronous Digital Hierarchy (SONET/SDH) Add-Drop Multiplexers (ADM) that multiplex together thousands of voice circuits in order to fill the capacity of high-speed fiber optic transmission facilities. These fibers typically operate at speeds ranging from, 155 megabits per second (Mbps) to 2.5 gigabits per second (Gbps), with 2.5 Gbps now prevalent on long haul backbone facilities.

As data traffic grows to dominate total capacity requirements, the limitations of using TDM technology within the network for data delivery become increasingly apparent. Because the data traffic itself is packet oriented, it cannot be optimally transported over TDM. At the network level, technologies such as Dynamic Packet Transport (DPT) recently announced by Cisco Systems, Inc. of San Jose, Calif., can be used to combine the bandwidth efficiency, service richness, and cost effectiveness of packet switched IP protocols with the bandwidth richness and proactive self-healing capability of fiber optic ring oriented structures. With DPT, bandwidth efficiency is increased through the elimination of fixed time slots and the use of a Media Access Control (MAC) layer protocol called the Spatial Re-use Protocol (SRP). This system is optimized to support scalable and survivable IP packet transport, and thus, reduces or eliminates the need for TDM equipment in IP networks.

While DPT devices running SRP protocols hold the promise of efficient routing of data traffic through a public network structure, there still remains the difficulty of optimizing the design of the internetworking devices themselves. One finds limitations in interconnect architectures for use within internetworking devices in particular, and computing devices, in general. The shortcoming is especially acute where such devices are primarily responsible for routing data traffic, such as in the case of a device like a router, and even in computing equipment such as a file server. The existing standardized bus structures such as the Industry Standard Architecture (ISA), Peripheral Component Interconnect (PCI), and other time slot based bus structures are not optimized for the transport of data packets. They do not provide maximum payload capacity, synchronization, or the ability to gracefully expand as the demand for bandwidth over a particular connection increases.

Certain recently proposed high-speed communication interfaces, such as the Gigabit Ethernet (GE) standard, provide a high-speed physical layer within the context of an Open System Interface (OSI) reference model. The GE protocols use a significant amount of the available bandwidth for signalling and for other overhead. However, such overhead is not necessary in tightly coupled system environments, such as between the processing elements in within a computing system.

SUMMARY OF THE INVENTION

The present invention is a high-speed circuit interconnect structure and a tightly coupled protocol for interconnecting electronics system components such as integrated circuits, processor chips, memory chips, Application Specific Integrated Circuits (ASICs), or other modular pieces be they physically embodied at a component, board, or chassis level.

An interconnect designed in accordance with the invention uses two or more high-speed links to transport data between components. The links use a lightweight packet oriented data protocol over a very high-speed data bus.

The protocol uses embedded control characters to delineate packets and to signal other events within individually encoded data channels. The preferred method for encoding each individual data channel is based on an 8-bit to 10-bit (8B/10B) method of encoding that supports the embedded control characters. The control characters are used to indicate the end of a packet without error, to indicate the end of a packet with error, to synchronize the receiver-transmitter pair, and to control the flow of data generated by the transmitter. The special control characters are also used in a particular format that allows concatenation of multiple links between a particular transmitter and receiver. In this way, a given packet may be efficiently transmitted on multiple links.

One particular embodiment of the invention is within an internetworking device, such as a router, in which a pair of high-speed ASICs perform a Ring Access Controller (RAC) function to add or remove data packets to or from a pair of counter rotating optical rings. The first RAC ASIC terminates ring traffic on a "West" side of the ring connection, while the second ASIC terminates the traffic on an "East" side.

The invention provides increased payload capacity as compared to standard interconnect protocols such as Peripheral Component Interconnect (PCI) while also providing for automatic resynchronization upon loss of synchronization at the receive end. Furthermore, the invention lends itself to providing a configurable number of serial links and efficient passing of packet oriented data over the multiple links.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF A PREFERRED EMBODIMENT 1.0 System Architecture

Figure 1:
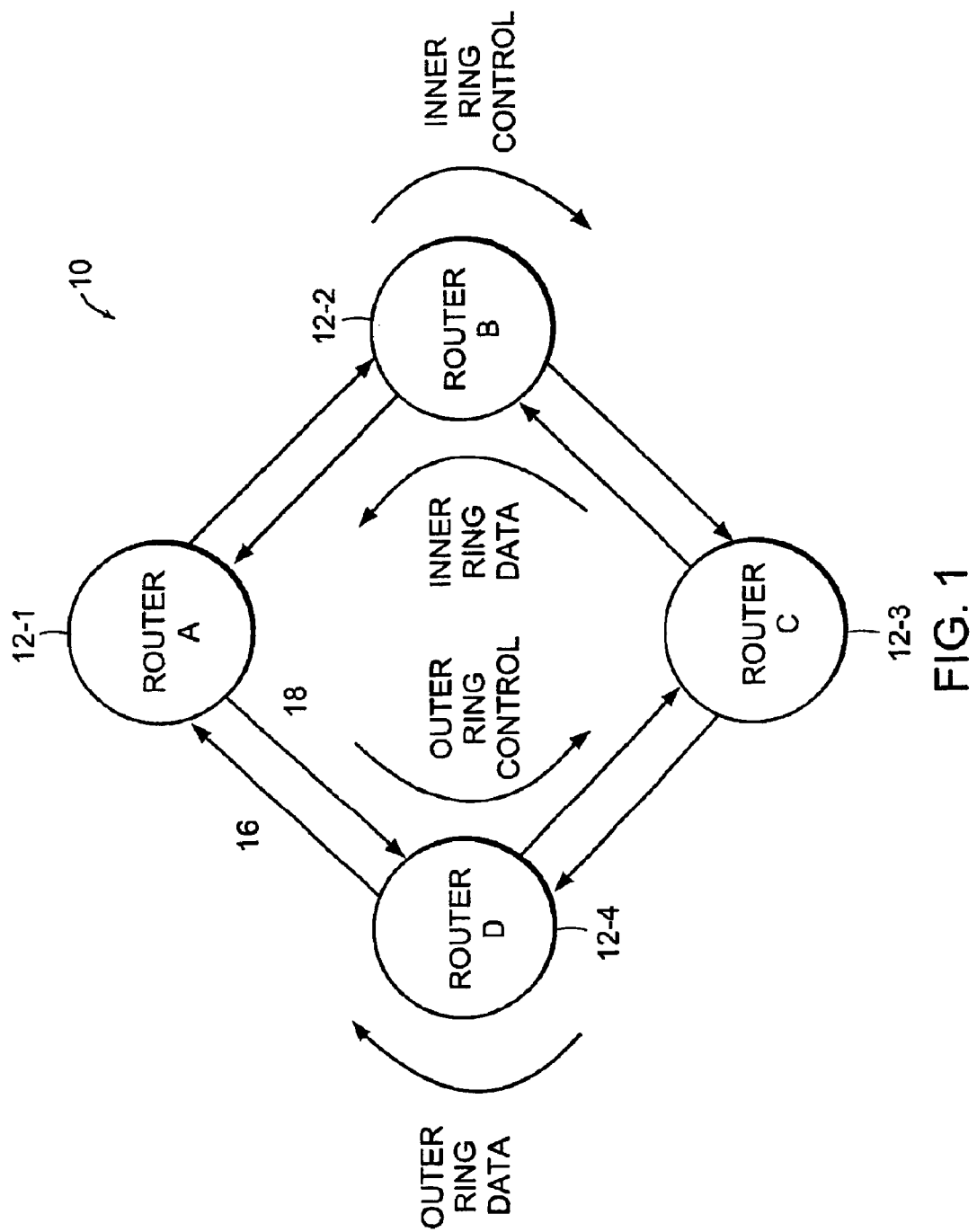
FIG. 1 is a block diagram of an electronic system in which the invention may be embodied, such as an internetwork device.

Turning attention now to FIG. 1, there is shown one example of a system 10 in which a high-speed interconnect structure and protocol may be used to particular advantage. It should be understood that the illustrated system is exemplary only and that other electronic systems may also make use of a configurable serial interconnection according to the present invention.

The illustrated system 10 is an internetworking device for routing packetized data among various locations. In this system 10, there are a number of nodes 12-1, 12-2, ... 12-N arranged in a ring type topology. Each specific node may, for example, include switches and/or router devices to connect to the ring in order to send data to the other devices connected to the ring. The specific ring illustrated uses a so-called Dynamic Packet Transport (DPT) technology which uses a pair of counter rotating fiber optic cables or 16 and 18 as the physical path to support transmission of data and control packets between the various nodes 12. It should be understood, however, that DPT is media independent and can be implemented over a variety of underlying circuit technologies (again, the described system 10 herein is by way of example only).

One important aspect of DPT is to leverage a Media Access Control (MAC) layer protocol called the Spatial Reuse Protocol (SRP). DPT technology provides structures such as SONET framing with embedded base transport capabilities at OC-12, OC-48, and up to OC-192 line rates. In this implementation, the data packets are sent in one direction, i.e., downstream, on one fiber ring, and the corresponding control packets are sent in the opposite direction, i.e., upstream on the other fiber ring. Thus, since each ring node 12 can source packets onto both rings 16 and 18 concurrently, the aggregate ring bandwidth is maximized. Unlike other types of rings making use of time division Time Division Multiplex (TDM), there are no time slots and no dedicated bandwidth provisions. Instead, DPT further maximizes traffic carrying capacity by providing statistical multiplexing which is packet oriented.

Figure 2:
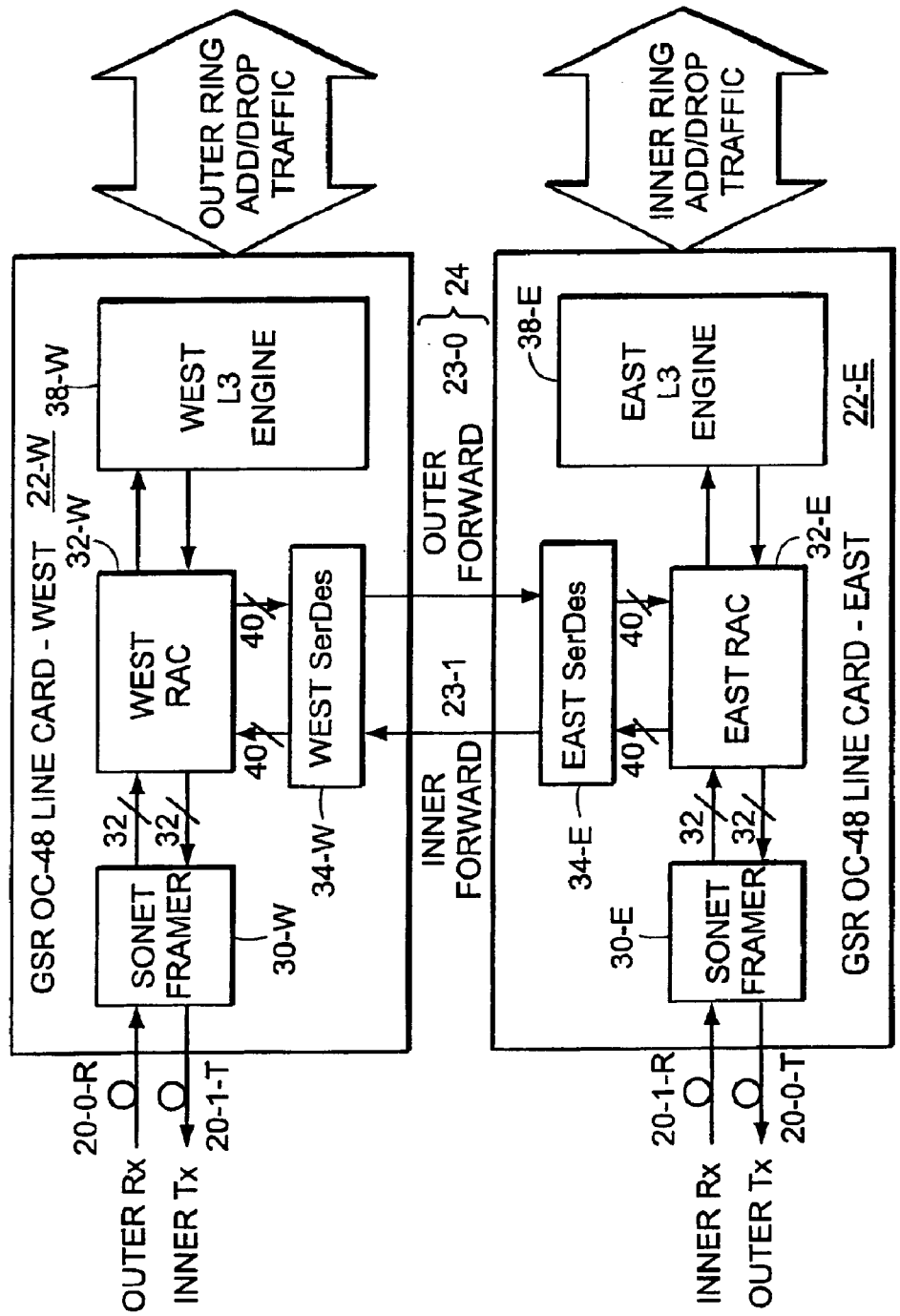
FIG. 2 is a more detailed block diagram of the internetwork device showing a high-speed interconnect between an inner ring forward data path and a outer ring forward data path.

Now turning attention to FIG. 2 more particularly, one of the nodes 12 will be discussed in greater detail. Specifically, it is now discussed how the node 12 makes use of a high-speed interconnect according to the invention. As shown, the node connects via four ports to the inner 16 and outer 18 rings, including an outer ring receive port 20-O-R, an inner ring transmit port 20-I-T, an inner ring receive port 20-I-R, and an outer ring transmit port 20-O-T. The functions of the node 12 are divided among two line cards, including a "West" line card 22-W and an "East" line card 22-E. The West line card 22-W is primarily responsible for receiving packets on the outer ring receive port 20-O-R, and for transmitting packets on the inner ring transmit port 20-O-T. The East line card 22-E is primarily responsible for receiving packets on the inner ring receive port 20-I-R, and for transmitting packets on the outer ring transmit port 20-I-T.

The two line cards 22-W and 22-E communicate with one another by sending data packets over a high-speed configurable interconnection 24 consisting of an outer forward link 23-O and an inner forward link 23-I, in accordance with the invention. That is, the West line card 22-W accepts packets received on the outer ring receive port 20-O-R, and if such packets are not destined for the node 12, forwards them over the outer forward link 23-O to the East line card 22-E, which in turn forwards them to the outer ring transmit port 20-O-T. Likewise, the East line card accepts packets received on the inner ring receive port, and if such packets are not destined for the node, forwards them over the inner forward link 23-I to the West line card 22-W, which in turn forwards them to the inner ring transmit port 20-I-T. As can be appreciated, the ports 20 accept data at extremely high optical data rates and, therefore, the inner forward 23-I and outer forward 23-O links must be accordingly fast in order not to reduce the effective data rates on the inner and outer rings 16 and 18. This is especially important for the traffic that is not destined for the particular node 12, so that such traffic may continue around the respective one of the inner or outer rings 16 or 18 without being slowed down by the line cards 22.

More particularly now, the exemplary West line card 22-W consists of a number of integrated circuits chips including a West SONET framer 30-W, a Ring Access Controller (RAC) 32-W, a Serializer/Deserializer (SerDes) 34-W, and a layer three (L3) packet processing engine. The East line card 22-E has an identical layout and includes and East SONET framer 30-E, East RAC 32-E, East SerDes 34-E, and East L3 packet engine 38-E.

In the receive direction, the West SONET framer 30-W is responsible for accepting data bits on the outer ring receive port 20-O-R, for extracting packets from this data stream, and for formatting these packets into sets of 32-bit groups. The West RAC 32-W is responsible for routing packets received from the West SONET framer 30-W to the East RAC 32-E, or to the West L3 packet processing engine 38-W, or to both the East RAC 32-E and the West L3 packet processing engine 38-W. In the transmit direction, the West SONET framer 30-W is responsible for accepting packets formatted in 32-bit groups, for inserting these packets into the data stream, and for transmitting the data bits on the inner ring transmit port 20-I-T. The West RAC 32-W is also responsible for accepting packets received from the East RAC 32-E or from the West L3 packet processing engine 38-W, and for forwarding them to the West SONET framer 30-W.

The SerDes 34-W and 34-E serialize or de-serialize data in appropriately sized chunks, such as the 40-bit bus shown, to and from the respective RAC over the interconnects 24. The SerDes are also responsible for recovering a clock signal from each serial data stream.

In operation, data entering from the outer ring 16 to the West line card 22-W flows through the West SONET framer 30-W and to the West RAC 32-W. If a given packet is not destined for this particular node 12, the packet is redirected to flow through the outer forward path 20-O to the East RAC 32-E. The data is then caused to flow out through the outer ring transmit port 20-O-T. If the given packet is destined for this node 12, it is sent to the West L3 packet processing engine 38-W. If a given multicast packet is destined for this node 12, it is sent to both to the West L3 packet processing engine 38-W and the East RAC 32-E.

If the inner ring data destination address of a packet is the node 12, the packet is forwarded through East L3 packet engine 38-E. If the node 12 needs to insert data onto the outer ring transmit port 20-O-T, it applies this data to the West line card 22-W. The data then flows from the West L3 packet processing engine 38-W to the West RAC 32-W, over the outer forward path 23-O to the East RAC 32-E, and finally out through the outer ring transmit port 20-O-T.

Analogous processing is performed for data flowing in the opposite direction on the inner ring, that is, for data entering from the inner ring 18 to the East line card 22-E, on the inner ring receive port 20-I-R. If the node 12 needs to insert data onto the inner ring, it applies this data from the East RAC 32-E through the East SerDes 34-E over the inner forward link 23-I to the West line card 22-W, and out the inner ring transmit port 20-I-T.

Figure 3:
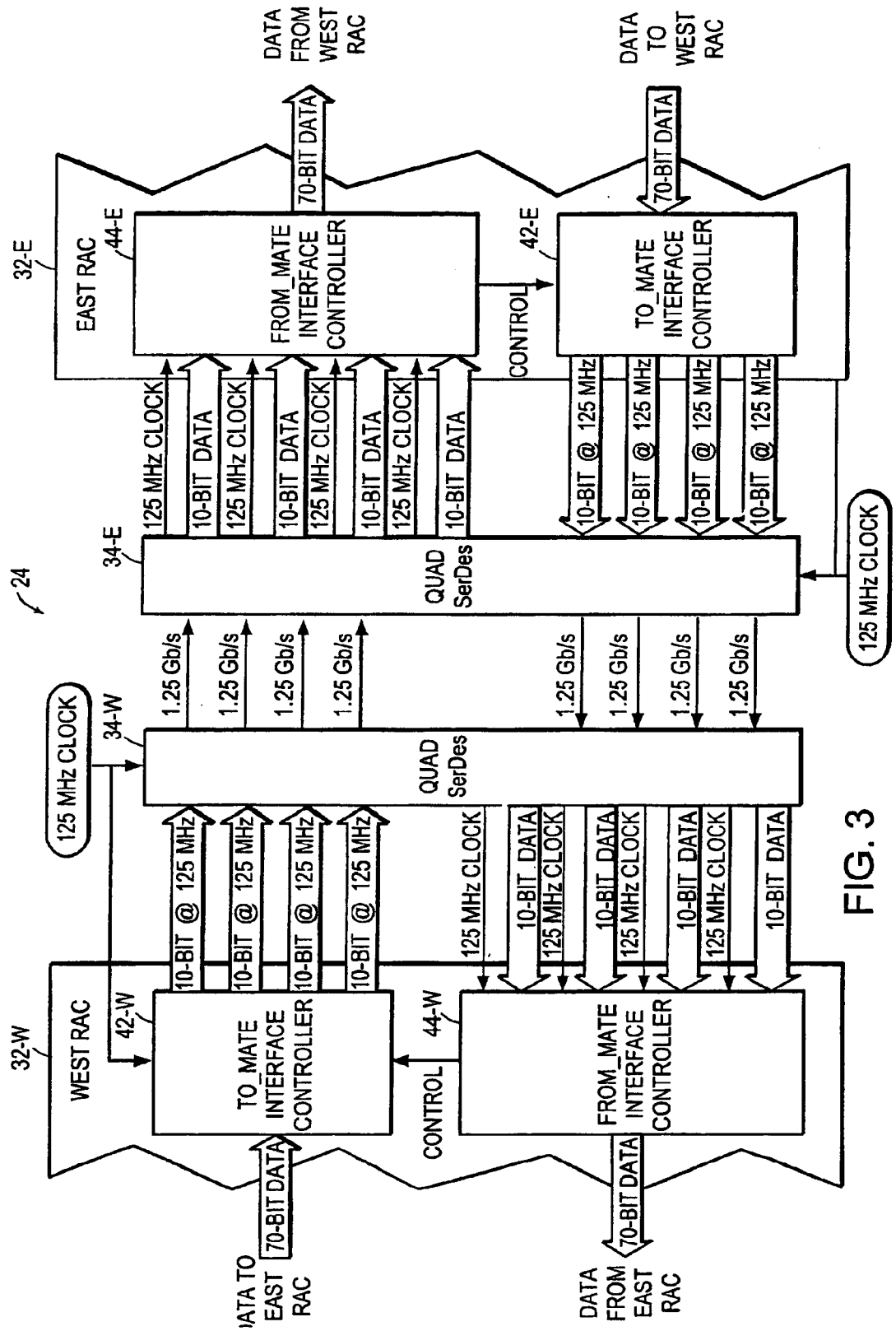
FIG. 3 is a detailed view of one embodiment of the a high-speed interconnect that uses four 1.25 Gb/s serial links in each direction.

FIG. 3 is a more detailed diagram of the West RAC 32-W and East RAC 32-E, including the West SerDes 34-W and the East SerDes 34-E. This figure details an implementation of a node 12 that is operating at a OC-48 line rate. In this implementation, the interconnect 24 between the two RACs 32 consists of a set of four independent 8B/10B encoded bidirectional data transfer channels, each operating at a rate of 1.25 Gb/s.

Figure 4:
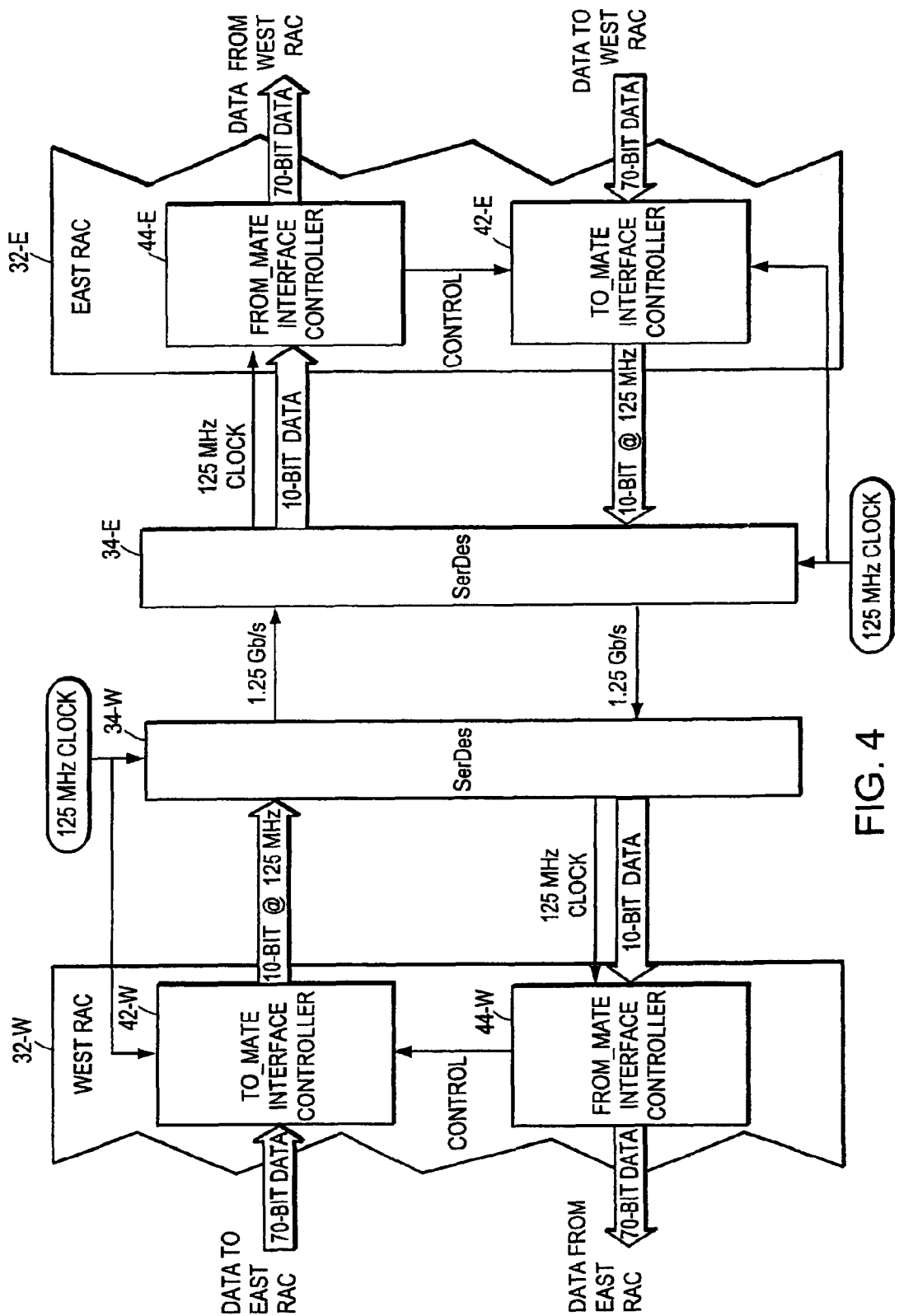
FIG. 4 is a detailed view of another embodiment of the high-speed interconnect which uses a single 1.25 Gb/s serial link in each direction.
Figure 5:
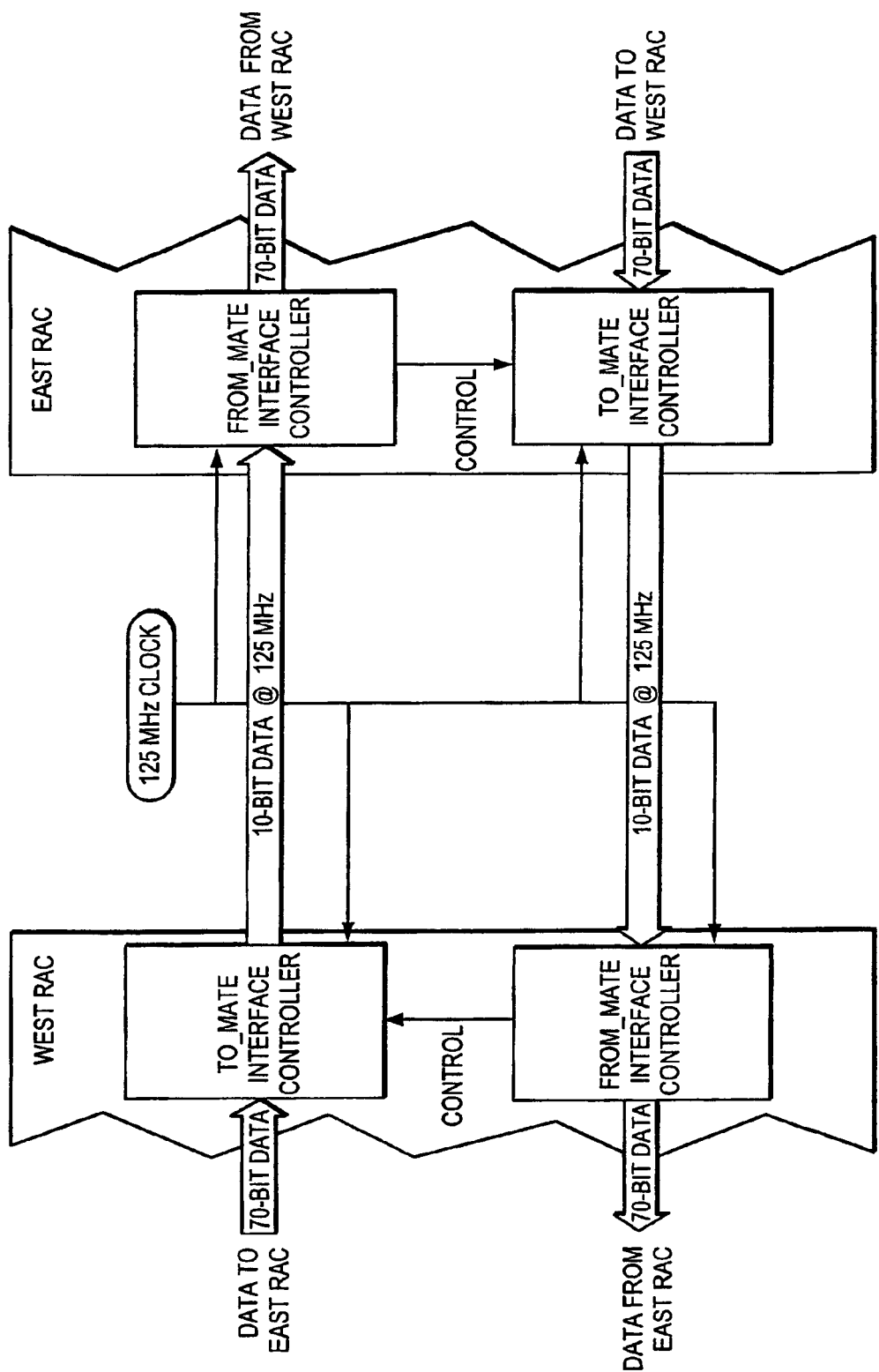
FIG. 5 is a detailed view of an embodiment of the high-speed interconnect using a single 10-bit data bus clocked at 125 Mhz in each direction.

To support an OC-12 line rate, the interconnect between the two RACs consists of only a single 8B/10B encoded bidirectional data transfer channel. This version of the interconnect interface is shown in FIG. 4. The SerDes modules 34 are used to minimize the number of coaxial cables (or fiber cables) needed to connect the two line cards. If the two RACs 32 are located on the same circuit board, the SerDes modules may be eliminated because the two RACs 32 can be directly connected over a bit parallel data bus on the circuit board. This type of interface is shown in FIG. 5.

2.0 Transmission Format

As shown in the diagram, each RAC 32 includes a respective to__mate interface transmitter 42 and from __mate interface receiver 44. These elements, which will be described in greater detail below, are responsible for converting data from the internal 70-bit wide data buses uses in the RACs 32 to the 10-bit wide encoded data format used over the interconnect 24.

An 8-bit to 10-bit (8B/10B) method of encoding is used to improve the transmission error characteristics for data transferred between the two RACs over the interconnect 24. This type of encoding ensures that there are enough signal level transitions on the serial link to accurately recover the clock at the receiver. The encoding also increases the probability of detecting single or multiple bit errors.

The 8B/10B encoding method used encodes each data byte into a 10-bit data character. This encoding method can be similar to the encoding methods used in other interfaces such as the so-called Gigabit Ethernet. However, the 8B/10B encoding method used on the interconnect 24 according to the invention also provides for additional 10-bit special characters that are used to indicate events such as End of Packet, End of Packet with Error, Transmit On, Transmit Off, and other events need to synchronize the receiver and the transmitter. The specific formats for each valid 10-bit data character used on the interface 24 are now described in the following discussion. Each valid data character is given a reference name that begins with the letter D: Dxx.y, where xx is the decimal value of bits [4:0] of the unencoded byte, and y is the decimal value of bits [7:5] of the unencoded byte. For example, data character D13.1 is used to transmit byte 0001101.

Similarly, each valid 10-bit special character is given a reference name that begins with the letter K. Only twelve special characters are defined: K28.n (n=0, 1, ... 7); K23.7; K27.7; K29.7; and K30.7. The interface 24 makes use of these special characters to implement a lightweight protocol. The special characters include four-character SYNC sequences as well as certain single control characters.

A SYNC sequence has the following format:

K28.5, Dxx.y, K28.5, Dxx.y

The K28.5 characters embedded within a SYNC sequence are used by the SerDes 34 to delineate the beginning and ending of each of the 10-bit characters received on the serial links. If multiple parallel serial links are used, the K28.5 characters are also used to align the parallel links at the receiver.

The Dxx.y characters that are embedded within a SYNC sequence are used for signalling purposes. The following SYNC signalling sequences are defined:

| | | |
|---|---|---|
| K28.5, D5.1, K28.5, D5.1 | SYNC-XON-PASS | Transmit On and Pass-through |
| K28.5, D5.6, K28.5, D5.6 | SYNC-XON | Transmit On |
| K28.5, D13.1, K28.5, D13.1 | SYNC-OOS | Out of Sync |
| K28.5, D21.1, K28.5, D21.1 | SYNC-XOFF-PASS | Transmit Off and Pass-through |
| K28.5, D21.5, K28.5, D21.5 | SYNC-XOFF | Transmit Off |

At any instant in time, many SYNC sequences may become simultaneously eligible for insertion into the transmit data stream by the corresponding RAC transmitter 42. To deal with this possibility, each SYNC sequence is assigned a priority, as shown below, with SYNC-OOS being assigned the highest priority:

1. SYNC-OOS
2. SYNC-XON or SYNC-XON-PASS or SYNC-XOFF or SYNC-XOFF-PASS

The following single control characters are also defined:

| | | |
|---|---|---|
| K28.0 | XON | Transmit On |
| K28.2 | EOP | End of packet |
| K28.3 | EOP-ERR | EOP and Error |
| K28.4 | XOFF | Transmit Off |
| K28.6 | OOS | Out of Sync |
| K23.7 | EOP-PASS | EOP and Pass-through |

The purpose of these various characters will become more evident from the following discussion. Basically, at any instant in time, many single control characters may become simultaneously eligible for insertion into the transmit data stream. To deal with this possibility, each single control character is assigned a priority, as shown below, with OOS being assigned the highest priority:

1. OOS
2. XON or XOFF
3. EOP-ERR
4. EOP-PASS
5. EOP

A SYNC sequence is transmitted during periods of time when there is no packet data ready for transmission. The single control character XON or XOFF is transmitted in the middle of a packet, to provide flow control. The single control character XON or XOFF may also be transmitted just before a SYNC sequence to ensure that the number of characters between two consecutive SYNC sequences is always odd. The single control character EOP, EOP-ERR, or EOP-PASS is transmitted only at the end of a packet, to provide packet delineation. It is implied that the first packet data transmitted after an EOP, EOP-ERR, or EOP-PASS, is the data at the start of the next packet. The single control character OOS is transmitted in the middle of packet, to indicate that a local from_mate controller 44 has reached the OOS state.

The purpose of the various control characters will be further explained in connection with the flow diagram of FIG. 9 below.

Figures 6, 7:
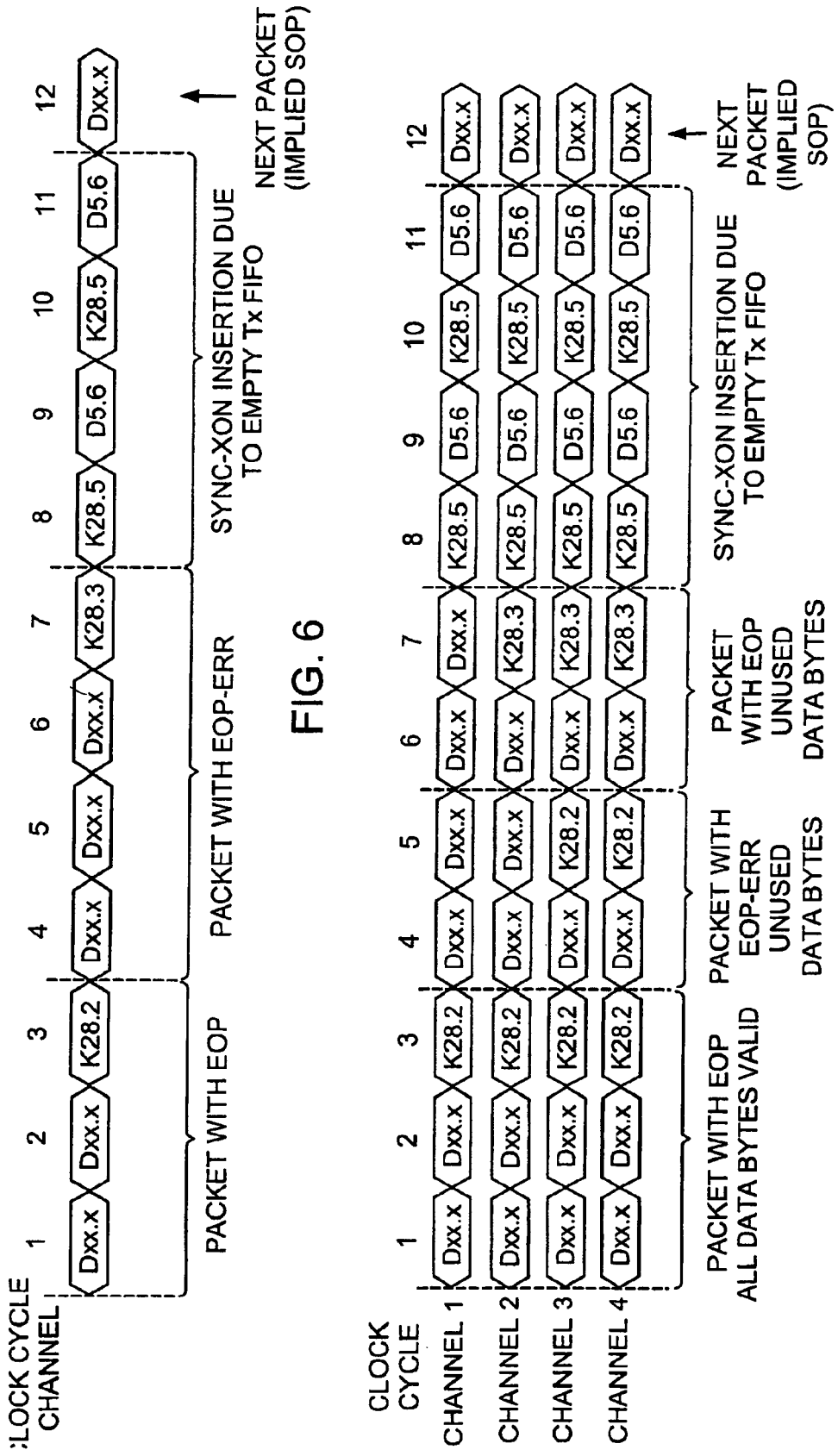
FIG. 6 is a diagram showing how packets may be formatted for transmission over single channel.
FIG. 7 is a diagram showing how packets may be formatted for transmission over our parallel channels.

FIG. 6 illustrates an example of how these control characters may be used with the single channel embodiment of FIGS. 4 and 5. In this example, a data packet was encoded in clock cycle 1–3. Cycles 4–7 include an encoded data packet with an end-of-packet control character K28.3, indicating that an error has occurred in the opposite direction on the link. Bytes transmitted during cycles 8–11 carry the SYNC sequence since no data is present for transmission during that time. Cycle 12 is the beginning of a next packet, with a start of packet event implied.

The transmission format used with the four parallel channel embodiment of FIG. 3 is shown in FIG. 7. Within each packet, data is transmitted in groups of four data characters. The four data characters are then mapped to the respective parallel channels according to the increasing order of the channel number. The first data character of a packet is always sent on channel 1, the second on channel 2, the third on channel 3, the fourth on channel 4, the fifth on channel 1, and so on. At the end of a packet, the last data transfer includes 1, 2, 3, or 4 data characters. If the last data transfer includes 1, 2, or 3 data characters, an appropriate end-of-packet control character EOP, EOP-ERR, or EOP-PASS is transmitted on the unused channels see, for example, clock cycles 4–7. If the last data transfer includes four data characters, the appropriate control character EOP (not shown), EOP-ERR, or EOP-PASS is transmitted on all channels during the following clock cycle. A SYNC sequence is transmitted on all channels if there is no packet data ready for transmission, such as cycles 8–11. The single control character XON or XOFF may also be transmitted on all channels, in the middle of a packet, to provide flow control. The single control character XON or XOFF may also be transmitted on all channels, just before a SYNC sequence, to ensure that the number of characters transmitted between two SYNC sequences is either even or equal to zero. The single control character EOP, EOP-ERR, or EOP-PASS is transmitted only at the end of a packet, to provide packet delineation. It is implied that the first packet data transmitted on channel 1 after an EOP, EOP-ERR, or EOP-PASS, is the data at the start of the next packet. The single control character OOS is transmitted on all four channels, in the middle of a packet, to indicate that the local from_mate controller 44 has reached the OOS state.

3.0 To_mate Interface Controller

Figure 8:
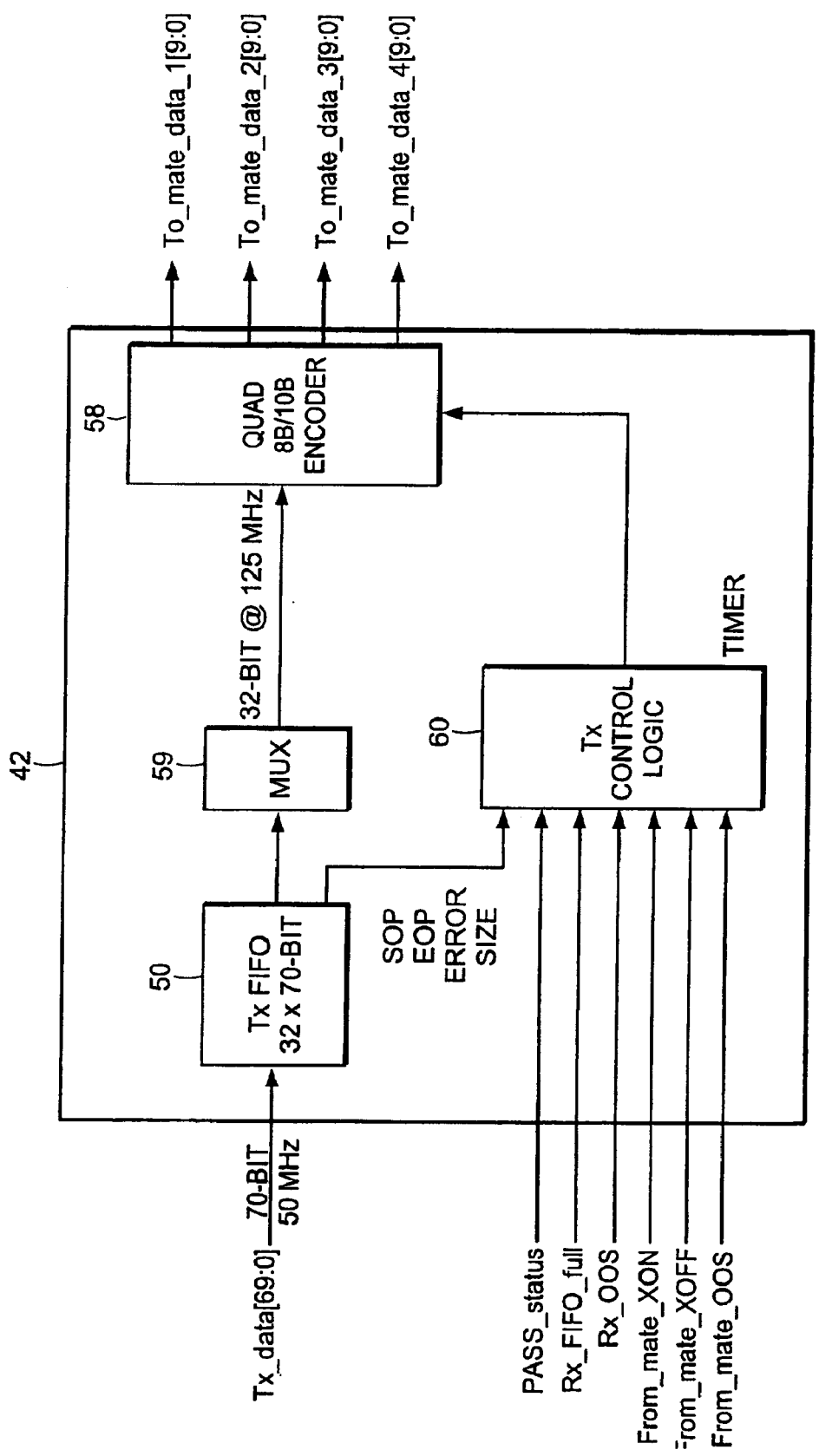
FIG. 8 is a detailed block diagram of a to_mate interface controller using four parallel channels.

A block diagram of the to_mate interface controller 42 is illustrated in FIG. 8. The to_mate interface controller 42 can be configured to transmit data on either a single channel or four parallel channels. Transmit data is received on a 70-bit bus clocked at 50 MHz and is stored into a Tx FIFO 50. The 70-bit bus includes 64-bit data and the following data qualifier: 3-bit SIZE, 1-bit SOP, 1-bit EOP, and 1-bit ERROR. The storage capacity of the Tx FIFO 50 is equal to 32 70-bit words. The 64-bit data is read from the Tx FIFO 50 and is forwarded to a Quad 8B/10B encoder 58 through a multiplexer 54 to a 32-bit data bus clocked at 125 MHz. The corresponding data qualifiers are read from the Tx FIFO 50 and are forwarded to Tx control logic block 60.

Figure 9:
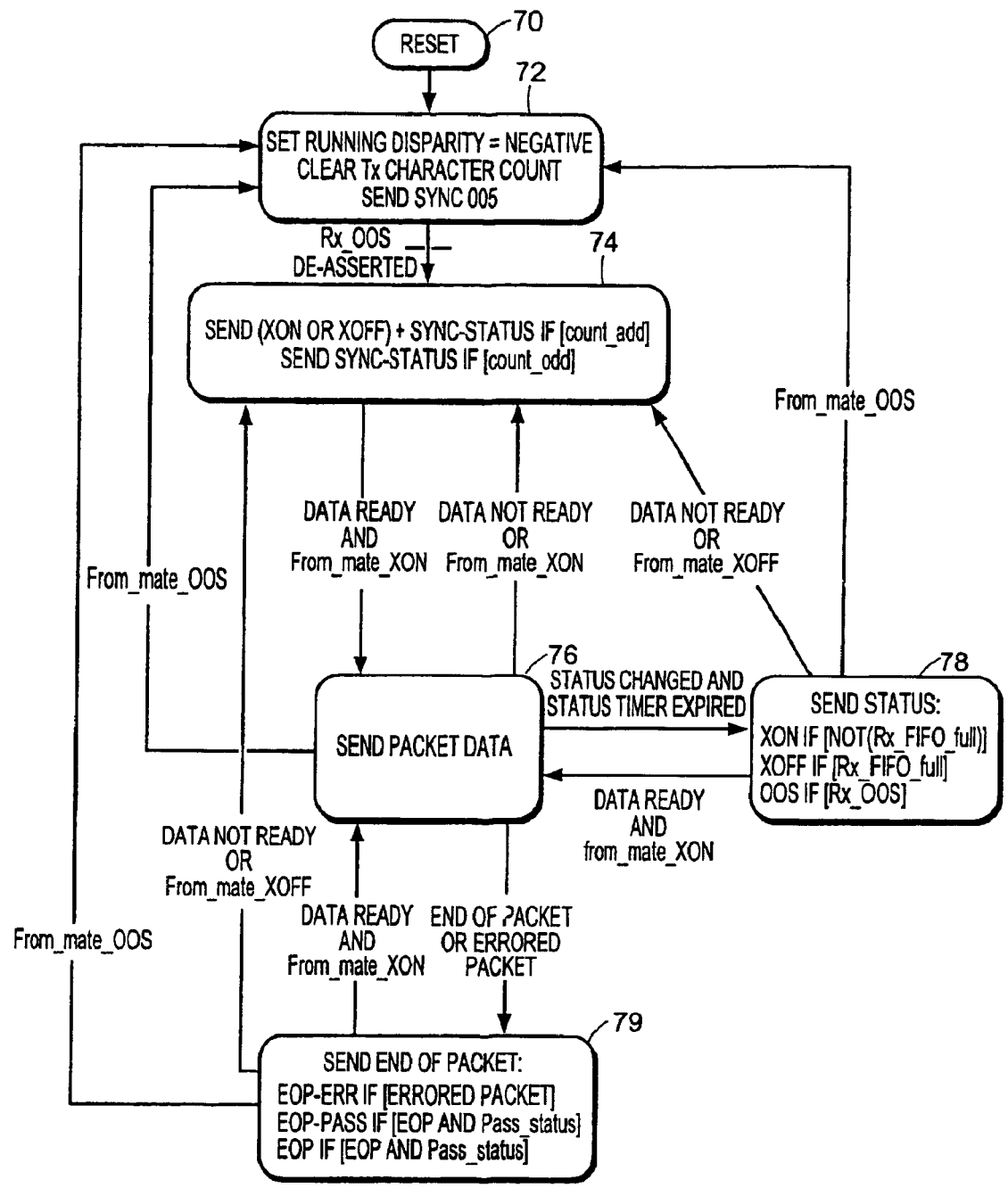
FIG. 9 is a state transition diagram describing the behavior of the to_mate interface controller.

The state transition diagram of the Tx control logic block 60 is illustrated in FIG. 9. Upon initial power-up in state 70, the to_mate interface controller 42 resets its running disparity in state 72. Then, it keeps sending the SYNC-OOS sequence until the signal Rx_OOS is de-asserted, to indicate that the local from_mate interface controller 44 is synchronized with the received data. This forces the transmission of the SYNC-XOFF sequence if the signal PASS_status is not asserted, or the SYNC-XOFF-PASS sequence occurs if the signal PASS_status is asserted. Then, if the local Tx FIFO 50 contains data ready for transmission, and if the signal from_mate_XON is asserted, the to_mate interface controller 42 enters into a Send packet data state 76. In addition, certain status information forwarded from the corresponding from_mate interface controller 44 are used by the Tx control logic 60, including Pass_status, Rx_FIFO_full, Ra_OOS, from_mate_XON, from_mate XOFF, and from_mate OOS.

In state 76, if the signal from_mate_OOS is asserted, the to_mate interface controller 42 returns to an initial power-up state. It then exits from this state, resets its running disparity, and returns to state 72 to start sending the appropriate SYNC sequence.

Back in state 76, if the signal from_mate_XOFF is asserted or if the local Tx FIFO 50 does not contain any data ready for transmission, the to_mate interface controller 42 exits state 76 and returns to state 74, to start sending the appropriate SYNC sequence.

In state 74, the number of 10-bit characters transmitted between two SYNC sequences must be even or equal to zero. The to_mate interface controller 42 thus maintains a count of the number of characters sent after the transmission of the last SYNC sequence. This count is used to determine if a single additional XON or XOFF control character must be inserted before the transmission of the next SYNC sequence. This count is cleared upon initial power-up or after the transmission of a SYNC sequence.

The to_mate interface controller 42 also exits from the send packet data state 76 if one of the following conditions occurs: the local Tx FIFO 50 does not contain any data ready for transmission; the signal from_mate_XOFF is asserted; end of packet is detected; end of packet with error is detected; the status changed or the status timer has expired.

In an instance where the local Tx FIFO does not contain any data ready, or if the from_mate_XOFF signal is asserted, the to_mate interface controller 42 returns to state 74. If an end of packet is detected, or end of packet and error occurs, the controller 42 proceeds to state 79.

Finally, if certain status information has changed in the corresponding to_mate controller 44, such as in a receive FIFO (Rx FIFO), state 78 is entered. State 78 is also entered upon expiration of a status timer.

In each of states 78 and 79, if a data not ready or from_mate_XOFF condition occurs, processing returns to state 74. Similarly, if the from_mate_OOS signal is asserted, State 72 is re-entered.

3.1 Status Timer

The single control characters XON, XOFF, or OOS may have to be inserted into the data flow while the to_mate interface controller 42 is transmitting packet data. To allow the insertion of these additional characters into the data flow, the maximum clock rate of the interface 24 must be greater than the maximum rate of the packet data. A status timer is included within the Tx control logic to allocate some bandwidth for the transmission of the control characters. When this timer expires, the transmission of packet data may be interrupted to insert a control character.

In the case of OC-48, we can calculate the spare bandwidth that is available for the transmission of the control characters. The maximum rate of the interface is:

Maximum rate before 8B/10B encoding=0 Gb/s×4 channels=4.0 Gb/s

If we consider the worst case scenario, that is, a continuous stream of 40-byte packets, each packet transfer across the interface requires ten 125 MHz clock cycles for the packet data and one 125 MHz clock cycle for the EOP characters. After the subtraction of the bandwidth consumed by the EOP characters, we obtain the actual maximum rate of the interface:

Actual maximum rate of the interface=4.0 Gb/s×(10/11)= 3.64 Gb/s

The maximum rate of the packet data is equal to (64 bits×50 MHz)=3.2 Gb/s. The spare bandwidth is equal to (3.64−3.20) Gb/s=0.44 Gb/s. The ratio of the spare bandwidth over the total bandwidth is equal to 0.44/3.64=12.1%. If the status timer is programmed to expire after eight 125 MHz clock cycles, the ratio of the bandwidth consumed by the control characters over the total bandwidth is equal to 1/(1+8)=11.1%. In this case, there is enough spare bandwidth to insert the control characters.

In the case of OC-12, we obtain the following results:

Maximum rate before 8B/10B encoding=1.0 Gb/s

Actual maximum rate of the interface=1.0 Gb/s×(40/41)= 0.98 Gb/s

Maximum rate of the packet data=16 bits×50 MHz 0.80 Gb/s

Spare bandwidth=(0.98−0.80) Gb/s=0.18 Gb/s

Ratio of the spare bandwidth over the total bandwidth=0.18/ 0.98=18.4%

3.2 Signalling of Pass-Through Status

The West RAC 32-W is responsible for adding or removing data traffic on the outer ring, while the East RAC 32-E is responsible for adding or removing data traffic on the inner ring. Either of the two RACs 32, or both, can be configured to operate in a pass-through mode. A RAC 32 that is configured in the pass-through mode neither removes nor adds data traffic on the corresponding ring: the data is accepted on the receive port of the ring and is always forwarded to the transmit port of the same ring.

The two RACs 32 exchange pass-through status information over the interface 24. If there is no packet data being transferred on the corresponding forward data path 23 between the two RACs, the local RAC 32 transmits the following SYNC sequences to indicate its pass-through status to the mate RAC:

SYNC-XON-PASS or SYNC-XOFF-PASS: Pass-through mode is enabled

SYNC-XON or SYNC-XOFF: Pass-through mode is not enabled

If some packet data is being transferred on the forward data path 23 between the two RACs 32, the pass-through status is indicated by transmitting a corresponding control character at the end of each packet:

EOP-PASS: End of packet, pass-through mode is enabled

Figure 10:
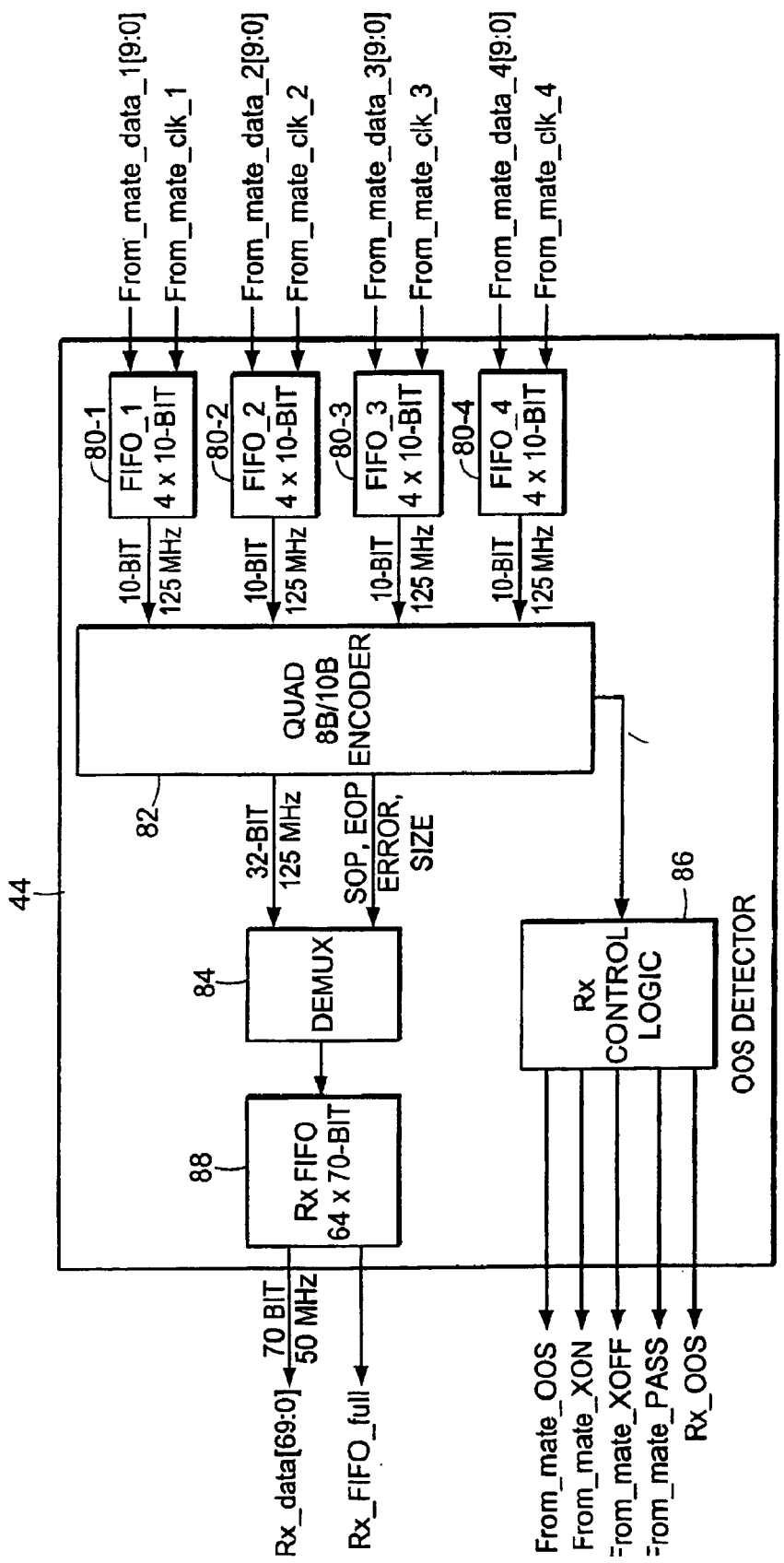
FIG. 10 is a detailed block diagram of a from_mate interface controller using four parallel channels.

EOP: End of packet, pass-through mode is not enabled 4.0 From_mate Interface Controller A block diagram of the from_mate interface controller 44 is illustrated in FIG. 10. As already mentioned, the from_mate interface controller 44 can be configured to receive data on either a single channel or four parallel channels, with each consisting of a 10-bit data bus and a 125 MHz clock. Dedicated to each channel is an input FIFO 80-1, 80-2, 80-3, 80-4. The input FIFOs 80, which may be 4×10 bits in size, are used to realign the separate channels to a common 125

MHz system clock. The maximum skew that can be tolerated between the channels is equal to 16 ns, or equivalently, two 125 MHz clock periods. Channel alignment is done by detecting and then aligning the SYNC sequences so that they are received simultaneously on all channels at the output of the FIFOs 80. Channel alignment is needed, of course, only if the from_mate interface controller is configured to receive data on multiple parallel channels.

In the case of OC-48, the 10-bit data at the output of each FIFO 80 is then 8B/10B decoded by the decoder 82. The resulting 8-bit data busses are combined to produce a single 32-bit data bus clocked at 125 MHz. Two 125 MHz data cycles are then merged to form a 64-bit data bus clocked at 62.5 MHz. The following data qualifiers are added to the 64-bit data bus: 3-bit SIZE, 1-bit SOP, 1-bit EOP, and 1-bit ERROR.

The resulting 70-bit words are then written into the main receive (Rx) FIFO 88 (64×70-bit words), to allow the data to leave the 62.5 MHz clock domain and to enter into the 50 MHz clock domain required on the interconnect. The depth of the main Rx FIFO 88 must be large enough to provide maximum data throughput without buffer overflow, for a given flow control latency.

In the case of OC-12, only one channel is used. The 10-bit data at the output of FIFO_1 80_1 is 8B/10B decoded. The resulting 8-bit data bus is demultiplexed into a 64-bit data bus as in the four channel embodiment. The following data qualifiers are added to the 64-bit data bus: 3-bit SIZE, 1-bit SOP, 1-bit EOP, and 1-bit ERROR. The resulting 70-bit words are then written into the main Rx FIFO 88 (64×70-bit words).

The Rx_FIFO_full signal is asserted if the fill level of the Rx FIFO 88 is above a programmable threshold. The interface controller 42 sends a "Transmit Off" (XON) indication if Rx_FIFO_full is asserted, and a "Transmit On" (XOFF) indication if Rx_FIFO_full is not asserted, to inform the companion RAC of its FIFO status.

The Rx Control Logic block 86 detects the control messages that are received from the mate device and asserts the following signals:

| | |
|---|---|
| From_mate_OOS: | Asserted only if an OOS indication is received from the mate device |
| From_mate_XON: | Asserted only if a XON indication is received from the mate device |
| From_mate_XOFF: | Asserted only if a XOFF indication is received from the mate device |
| From_mate_pass_through: | Asserted only if a pass-through indication is received from the mate device |

The Rx Control Logic block 86 also detects an OOS condition on the received channels. The Rx_OOS signal is asserted to indicate that an OOS condition is detected on the received channels. The algorithm used by the Rx Control Block 86 to detect an OOS condition is described in the following section.

4.1 Out Of Sync (OOS) Detector

Figure 11:
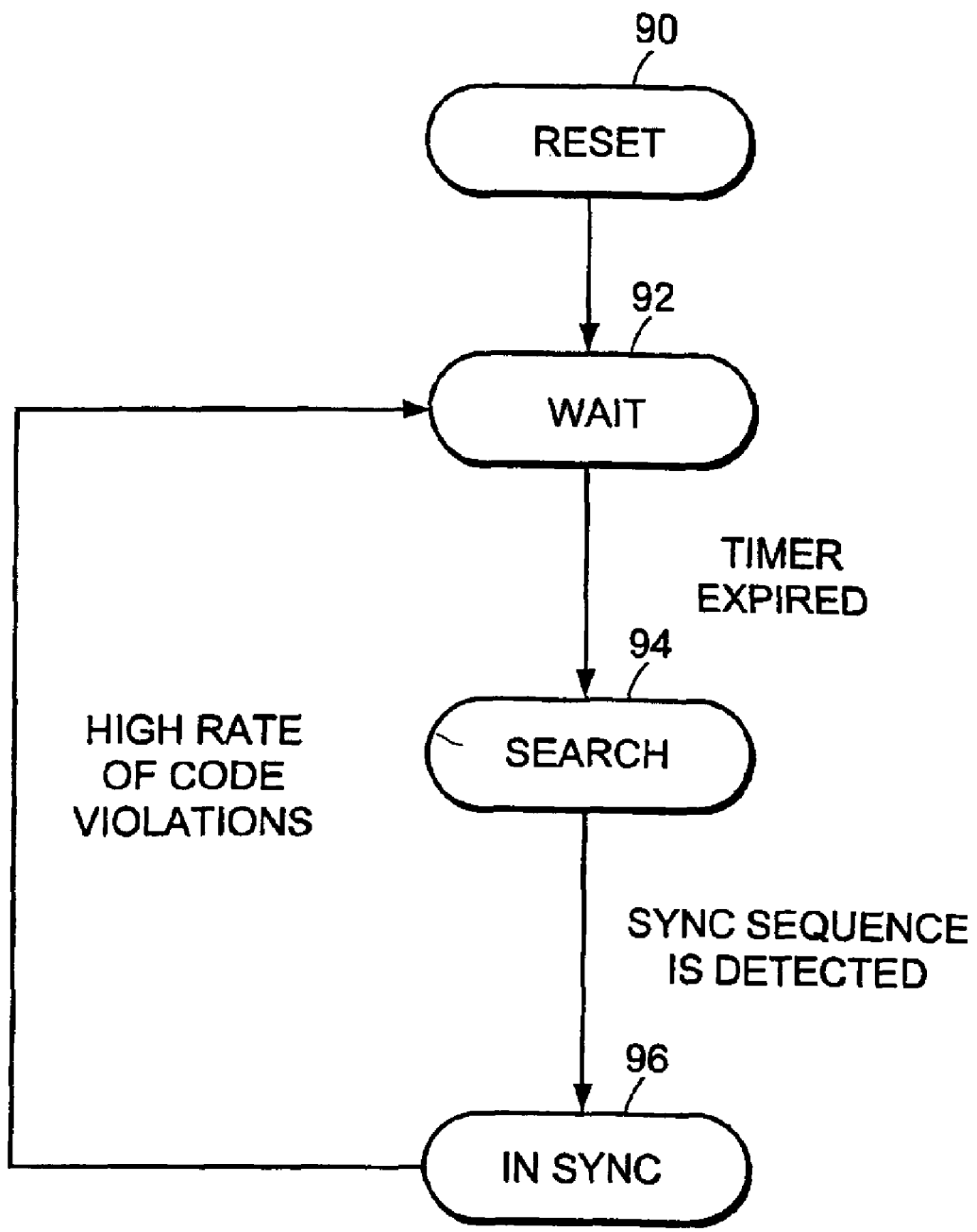
FIG. 11 is a state transition diagram of an Out Of Sync (OOS) detector for a single channel implementation.

The state transition diagram of the circuits used to detect an OOS condition for the single channel (OC-12) is described in FIG. 11. After the OOS detector exits from the Reset state 90, in state 92 it waits for some time to allow the mate device to transmit a continuous stream of SYNC sequences. Then a Search state 94 is entered. Upon the reception of a SYNC sequence, the OOS detector leaves the Search state and enters into the In Sync state 96. The OOS detector leaves the In Sync state if the 8B/10B decoder detects a high rate of code violations. The Rx_OOS signal is asserted if the current state of the OOS detector is not in the In Sync state 96.

Figure 12:
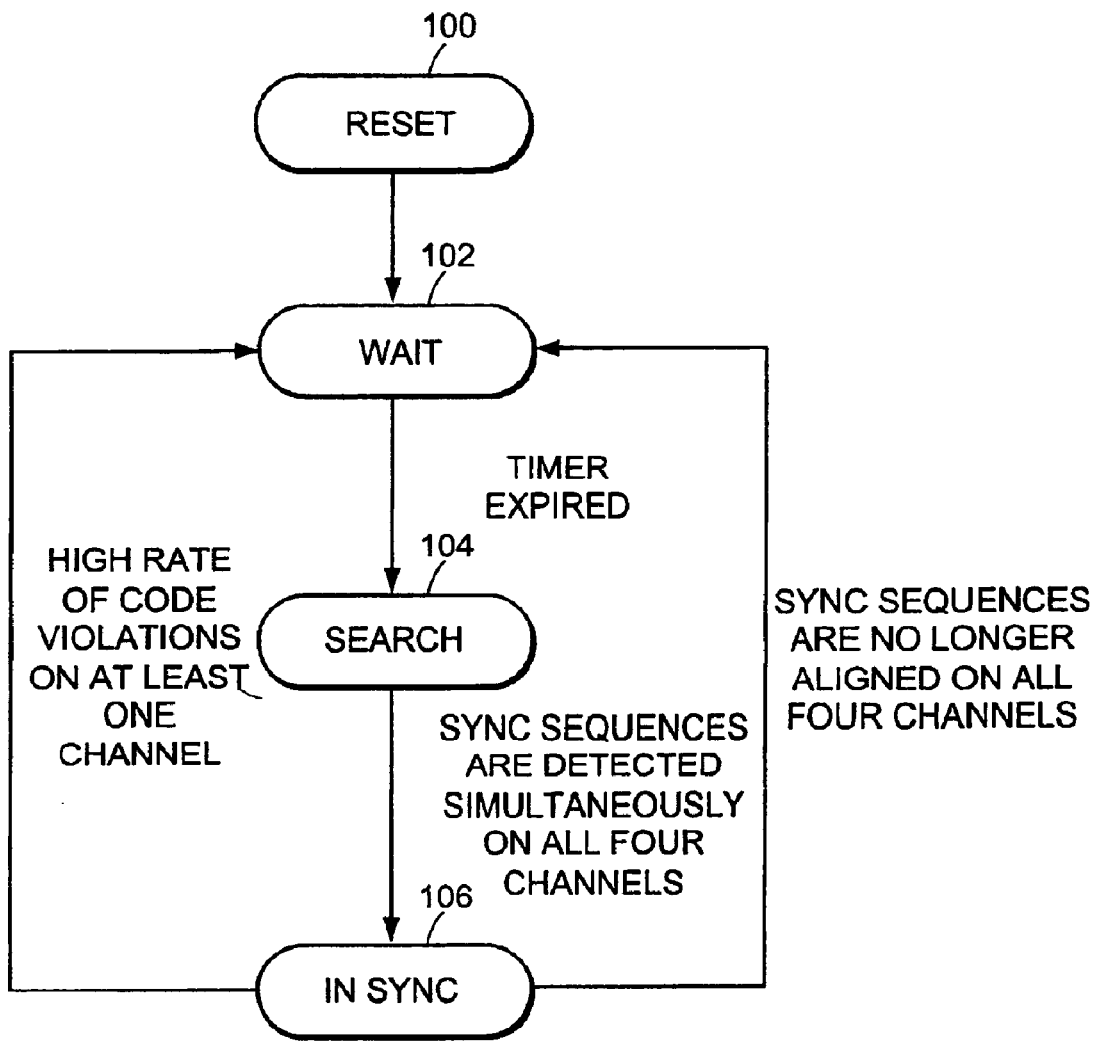
FIG. 12 is a state transition diagram of an Out Of Sync (OOS) detector for a four parallel channel implementation.

A state transition diagram of the circuits used to detect an OOS condition for the four parallel channel (OC-48 case) is described in FIG. 12. After the OOS detector exits from the Reset state 100, it waits in state 102 for some time to allow the mate device to transmit a continuous stream of SYNC sequences on all four channels and then it enters into the Search state 104. Upon the reception of four simultaneous SYNC sequences (one SYNC sequence on each channel), the OOS detector leaves the Search state 104 and enters into the In Sync state 106. The OOS detector leaves the In Sync state 106 if a high rate of code violations is detected on at least one channel, or if the SYNC sequences are no longer aligned on all four channels. The Rx_OOS signal is asserted if the current state of the OOS detector is not the In Sync state 106.

While this invention has been particularly shown and described with references to preferred embodiments thereof, it will be understood by those skilled in the art that various changes in form and details may be made therein without departing from the scope of the invention encompassed by the appended claims.

What is claimed is:

1. An interconnect for transporting, within a network node, data between a primary circuit component and a secondary circuit component, the interconnect comprising:

(a) primary to_mate transmitting means, including a buffer for storing data to be transmitted over the interconnect, and a transmit controlling means for controlling the insertion of control characters into the data to be transmitted;

(b) primary from_mate receiving means, including a buffer for storing received data, and a receive controlling means for interpreting control characters inserted into the data;

(c) secondary to_mate transmitting means, including a buffer for storing data to be transmitted over the interconnect, and a transmit controlling means for controlling the insertion of control characters into the data stream to be transmitted;

(d) secondary from_mate receiving means, including a buffer for storing received data, and a receive controlling means for interpreting the control characters inserted into the data;

(e) first linking means for communicating data between the primary to_mate transmitting means and the secondary from_mate receiving means;

(f) second linking means for communicating data between the secondary to_mate transmitting means and the primary from_mate receiving means, the second linking means operating distinctly from the first linking means such that data may be transmitted at the same time over the first linking means and the second linking means;

(g) whereby the transmit controlling means in the primary to_mate transmitting means is connected with the receive controlling means in the primary from_mate receiving means, and the transmit controlling means in the secondary to_mate transmitting means is connected with the receive controlling means in the secondary from_mate receiving means, such that when a receive controlling means in the respective from_mate receiving means detects that the fill level of the receive buffer is above a threshold, the corresponding to_mate transmit controlling means inserts a transmit off (XOFF) control character in the data, and when the receive controlling means in the respective from_mate receiving means detects a transmit off (XOFF), the corresponding to_mate transmitting means stops transmitting data; and (h) whereby the transmit controlling means in the primary to_mate transmitting means is connected with the receive controlling means in the primary from_mate receiving means, and the transmit controlling means in the secondary to_mate transmitting means is connected with the receive controlling means in the secondary from_mate receiving means, such that when the receive controlling means in the respective from_mate receiving means detects that the fill level of the receive buffer is below a threshold, the corresponding to_mate transmit controlling means inserts a transmit on (XON) control character, and when the receive controlling means in the respective from_mate receiving means detects a XON control character, the corresponding to_mate transmitting means is enabled to transmit data.

2. An apparatus as in claim 1 wherein the transmit controlling means in the primary to_mate transmitting means is connected with the receive controlling means in the primary from_mate receiving means, and the transmit controlling means in the secondary to_mate transmitting means is connected with the receive controlling means in the secondary from_mate receiving means, such that when the receive controlling means in the respective from_mate receiving means detects an Out of Sync (OOS) indication, the corresponding to_mate transmit controlling means inserts a synchronization sequence (SYNC_OOS) until the OOS indication is no longer detected by the from_mate receiving means.

3. An apparatus as in claim 1 wherein each of the first and second linking means additionally comprise multiple parallel circuit paths over which data can be simultaneously transmitted and received.

4. An apparatus as in claim 1 wherein each transmit controlling means comprises a timer to ensure that the control characters XON, XOFF, and OOS are inserted at regular intervals during the transmission of a packet.

5. An apparatus as in claim 1 wherein the data is encoded with an 8-bit to 10-bit encoder and the control characters are encoded with 10-bit code words which are not assigned to encode data symbols.

6. An apparatus as in claim 1 wherein the primary and secondary circuit components are located on different circuit boards.

7. An apparatus as in claim 1 wherein:

(i) the primary to_mate transmitting means is connected to the secondary from_mate receiving means to permit data to be passed through between them, and the secondary to_mate transmitting means is connected to the primary from_mate receiving means to permit data to be passed through between them, and wherein pass-through connection status information is encoded onto the control characters.

8. An apparatus as in claim 7 wherein the pass-through connection status information is encoded into the XON or XOFF control characters.

9. An interconnect for transporting data between a primary circuit component and a secondary circuit component, the interconnect comprising:

(a) primary to_mate transmitting means, including a buffer for storing data to be transmitted over the interconnect, and a transmit controlling means for controlling the insertion of control characters into the data to be transmitted;

(b) primary from_mate receiving means, including a buffer for storing received data, and a receive controlling means for interpreting control characters inserted into the data;

(c) secondary to_mate transmitting means, including a buffer for storing data to be transmitted over the interconnect, and a transmit controlling means for controlling the insertion of control characters into the data stream to be transmitted;

(d) secondary from_mate receiving means, including a buffer for storing received data, and a receive controlling means for interpreting the control characters inserted into the data;

(e) first link means for communicating data between the primary to_mate transmitting means and the secondary from_mate receiving means;

(f) second linking means for communicating data between the secondary to_mate transmitting means and the primary from_mate receiving means, the second linking means operating distinctly from the first linking means such that data may be transmitted at the same time over the first linking means and the second linking means;

(g) whereby the transmit controlling means in the primary to_mate transmitting means is connected with the receive controlling means in the primary from_mate receiving means, and the transmit controlling means in the secondary to_mate transmitting means is connected with the receive controlling means in the secondary from_mate receiving means, such that when a receive controlling means in the respective from_mate receiving means detects that the fill level of the receive buffer is above a threshold, the corresponding to_mate transmit controlling means inserts a transmit off (XOFF) control character in the data, and when the receive controlling means in the respective from_mate receiving means detects a transmit off (XOFF), the corresponding to_mate transmitting means stops transmitting data;

(h) whereby the transmit controlling means in the primary to_mate transmitting means is connected with the receive controlling means in the primary from_mate receiving means, and the transmit controlling means in the secondary to_mate transmitting means is connected with the receive controlling means in the secondary from_mate receiving means, such that when the receive controlling means in the respective from_mate receiving means detects that the fill level of the receive buffer is below a threshold, the corresponding to_mate transmit controlling means inserts a transmit on (XON) control character, and when the receive controlling means in the respective from_mate receiving means detects a XON control character, the corresponding to_mate transmitting means is enabled to transmit data; and (i) the primary to_mate transmitting means is connected to the secondary from_mate receiving means to permit data to be passed through between them, and the secondary to-mate transmitting means is connected to the primary from_mate receiving means to permit data to be passed through between them, and wherein the pass-through connection status information is encoded into an end of packet control character.

10. An apparatus as in claim 9 wherein the transmit controlling means in the primary to_mate transmitting means is connected with the receive controlling means in the primary from_mate receiving means, and the transmit controlling means in the secondary to_mate transmitting means is connected with the receive controlling means in the secondary from_mate receiving means, such that when the receive controlling means in the respective from_mate receiving means detects an Out of Sync (OOS) indication, the corresponding to_mate transmit controlling means inserts a synchronization sequence (SYNC_OOS) until the OOS indication is no longer detected by the from_mate receiving means.

11. An apparatus as in claim 9 wherein each of the first and second linking means additionally comprise multiple parallel circuit paths over which data can be simultaneously transmitted and received.

12. An apparatus as in claim 9 wherein each transmit controlling means comprises a timer to ensure that the control characters XON, XOFF, and OOS are inserted at regular intervals during the transmission of a packet.

13. An apparatus as in claim 9 wherein the data is encoded with an 8-bit to 10-bit encoder and the control characters are encoded with 10-bit code words which are not assigned to encode data symbols.

14. An apparatus as in claim 9 wherein the primary and secondary circuit components are located on different circuit boards.

15. An apparatus for transporting data between a first internetworking device and a second internetworking device, comprising:
   a pair of ring connecting means for coupling the first and second internetworking devices together, such that data packets travel along an outer ring direction from the first internetworking device to the second internetworking device, and such that data packets also travel along an inner ring direction from the second internetworking device to the first internetworking device;
   first and second ring access control means, associated with each of the first and second internetworking devices, each ring access controlling means for receiving data from a respective one internetworking device on a respective ring, and for transmitting data from the internetworking device onto the other ring, the ring access controlling means also for connecting pass-through data packets along a pair of forwarding paths, the forwarding paths including an outer forwarding path for forwarding pass-through data packets received from an outer ring input connection serviced by the first ring access controlling means to an outer ring output connection serviced by the second ring access controlling means, and the forwarding paths also including an inner forwarding path for forwarding pass-through data packets receiving from an inner ring input connection serviced by the second ring access controlling means to an inner ring transmit connection serviced by the first ring access controlling means; and
   wherein each of the ring access control means embed control characters in the data packets transmitted over the inner forward path and the outer forward path, the control characters indicating pass-through control information for the respective data packet in the same control character as used for synchronization.

16. An apparatus as in claim 15 wherein the control characters that indicate pass-through control information also indicate flow control status.

17. An apparatus as in claim 15 wherein a SYNC control character sequence is assigned for a SYNC-XON state in which the flow control is transmit on with no pass-through, a SYNC-XOFF state in which the flow control is transmit off with no pass-through, a SYNC-XON-PASS state in which the flow control is transmit on with pass-through, and a SYNC-XOFF-PASS state in which the flow control is transmit off with pass-through.

18. An apparatus as in claim 15 wherein the data packets are encoded using an 8-bit to 10-bit code, wherein the 10-bit code words not assigned to data are used for the control characters.

19. An apparatus as in claim 15 wherein the inner forward link and outer forward link are implemented using a plurality of individual parallel data busses, and wherein a plurality of data bytes comprising a packet are forwarded over the plurality of links together and in parallel, with any unused data bytes in a packet being replaced with idle control characters.

20. An apparatus for transporting data between a first internetworking device and a second internetworking device, comprising:
   a pair of ring connecting means for coupling the first and second internetworking devices together, such that data packets travel along an outer ring direction from the first internetworking device to the second internetworking device, and such that data packets also travel along an inner ring direction from the second internetworking device to the first internetworking device;
   first and second ring access control means, associated with each of the first and second internetworking devices, each ring access control means for receiving data from a respective one internetworking device on a respective ring, and for transmitting data from the internetworking device onto the other ring, the ring access control means also for connecting pass-through data packets along a pair of forwarding paths, the forwarding paths including an outer forwarding path for forwarding pass-through data packets received from an outer ring input connecting means serviced by the first ring access controlling means to an outer ring output connecting means serviced by the second ring access control means, and the forwarding paths also including an inner forwarding path for forwarding pass-through data packets receiving from an inner ring input connecting means serviced by the second ring access controlling means to an inner ring transmit connection serviced by the first ring access controlling means; and
   wherein each of the ring access controlling means embed control characters in the data packets transmitted over the inner forward path and the outer forward path, an end of packet control character indicating pass-through control information for the respective data packet and being used for synchronization.

21. An apparatus as in claim 20 wherein the control characters that indicate pass-through control information also indicate flow control status.

22. An apparatus as in claim 21 wherein a SYNC control character sequence is assigned for a SYNC-XON state in which the flow control is transmit on with no pass-through, a SYNC-XOFF state in which the flow control is transmit off with no pass-through, a SYNC-XON-PASS state in which the flow control is transmit on with pass-through, and a SYNC-XOFF-PASS state in which the flow control is transmit off with pass-through.

23. An apparatus as in claim 20 wherein the data packets are encoded using an 8-bit to 10-bit code, wherein the 10-bit code words not assigned to data are used for the control characters.

24. An apparatus as in claim 20 wherein the inner forward link and outer forward link are implemented using a plurality of individual parallel data busses, and wherein a plurality of data bytes comprising a packet are forwarded over the plurality of links together and in parallel, with any unused data bytes in a packet being replaced with idle control characters.

25. A computer program product comprising:
a computer usable medium for transporting data across an interconnect between a primary circuit component and a secondary circuit component;
a set of computer program instructions embodied on the computer usable medium, including instructions to:
(a) in a primary to_mate transmitter,
store, in a buffer, data to be transmitted over the interconnect, and
control, in a transmit controller, the insertion of control characters into the data to be transmitted;
(b) in a primary from_mate receiver,
store, in a buffer, received data, and
interpret, in a receive controller, control characters inserted into said received data;
(c) in a secondary to_mate transmitter,
store, in a buffer, data to be transmitted over the interconnect, and
control, in a transmit controller, the insertion of control characters into the data stream to be transmitted;
(d) in a secondary from_mate receiver,
store, in a buffer, received data, and
interpret, in a receive controller, control characters inserted into said received data;
(e) communicate, over a first link, data between the primary to_mate transmitter and the secondary from_mate receiver,
(f) communicate, over a second link, data between the secondary to_mate transmitter and the primary from_mate receiver, the second link operating distinctly from the first link such that data may be transmitted at the same time over the first link and the second link;
(g) whereby the transmit controller in the primary to_mate transmitter is connected with the receive controller in the primary from_mate receiver, and the transmit controller in the secondary to_mate transmitter is connected with the receive controller in the secondary from_mate receiver, further comprising instructions to:
detect, in a receive controller in the respective from_mate receiver, when the fill level of the receive buffer is above a threshold,
upon said detection, insert, in the corresponding to_mate transmit controller, a transmit off (XOFF) control character in the data,
detect, in the receive controller in the respective from_mate receiver, a transmit off (XOFF), and
upon said XOFF detection, stop, in the corresponding to_mate transmitter, transmission of data;
(h) whereby the transmit controller in the primary to_mate transmitter is connected with the receive controller in the primary from_mate receiver, and the transmit controller in the secondary to_mate transmitter is connected with the receive controller in the secondary from_mate receiver, further comprising instructions to:
detect, in the receive controller in the respective from_mate receiver, when the fill level of the receive buffer is below a threshold,
upon said detecting, insert, in the corresponding to_mate transmit controller, a transmit on (XON) control character,
detect, in the receive controller in the respective from_mate receiver, a XON control character, and
enable, in the corresponding to_mate transmitter, transmission of data; and
(i) whereby the primary to_mate transmitter is connected to the secondary from_mate receiver to permit data to be passed through between them, and the secondary to_mate transmitter is connected to the primary from_mate receiver to permit data to be passed through between them, further comprising instructions to:
encode the pass-through connection status information into an end of packet control character.

26. The computer program product of claim 25 wherein the transmit controller in the primary to_mate transmitter is connected with the receive controller in the primary from_mate receiver, and the transmit controller in the secondary to_mate transmitter is connected with the receive controller in the secondary from_mate receiver, further comprising instructions to:
detect, in the receive controller in the respective from_mate receiver, an Out of Sync (OOS) indication, and
upon said detection, insert, in the corresponding to_mate transmit controller, a synchronization sequence (SYNC_OOS) until the OOS indication is no longer detected by the from_mate receiver.

27. The computer program product of claim 25 wherein each of the first and second links additionally comprise multiple parallel circuit paths over which data can be simultaneously transmitted and received.

28. The computer program product of claim 25, further comprising instructions to:
insert the control characters XON, XOFF, and OOS at regular intervals during the transmission of a packet.

29. The computer program product of claim 25, further comprising instructions to:
encode the data with an 8-bit to 10-bit encoder; and
encode the control characters with 10-bit code words which are not assigned to encode data symbols.

30. The computer program product of claim 25 wherein the primary and secondary circuit components are located on different circuit boards.

31. A computer program product comprising:
a computer usable medium for transporting data between a first internetworking device and a second internetworking device, wherein a pair of ring connections couple the first and second internetworking devices together, such that data packets travel along an outer ring direction from the first internetworking device to the second internetworking device, and such that data packets also travel along an inner ring direction from the second internetworking device to the first internetworking device;
a set of computer program instructions embodied on the computer usable medium, including instructions to:
receive, in each of first and second ring access controllers associated with each of first and second internetworking devices, data from a respective one internetworking device on a respective ring;
transmit, in each of first and second ring access controllers associated with each of first and second internetworking devices, data from the internetworking device onto the other ring;

wherein the ring access controllers connect pass-through data packets along a pair of forwarding paths, the forwarding paths including an outer forwarding path for forwarding pass-through data packets received from an outer ring input connection serviced by the first ring access controller to an outer ring output connection serviced by the second ring access controller, and the forwarding paths also including an inner forwarding path for forwarding pass-through data packets receiving from an inner ring input connection serviced by the second ring access controller to an inner ring transmit connection serviced by the first ring access controller; and wherein each of the ring access controls embed control characters in the data packets transmitted over the inner forward path and the outer forward path, an end of packet control character indicating pass-through control information for the respective data packet and being used for synchronization.

32. The computer program product of claim 31 wherein the control characters that indicate pass-through control information also indicate flow control status.

33. The computer program product of claim 32 wherein a SYNC control character sequence is assigned for a SYNC-XON state in which the flow control is transmit on with no pass-through, a SYNC-XOFF state in which the flow control is transmit off with no pass-through, a SYNC-XON-PASS state in which the flow control is transmit on with pass-through, and a SYNC-XOFF-PASS state in which the flow control is transmit off with pass-through.

34. The computer program product of claim 31, further comprising instructions to:

encode the data packets using an 8-bit to 10-bit code; and encode the control characters with 10-bit code words not assigned to data.

35. The computer program product of claim 31 wherein the inner forward link and outer forward link are implemented using a plurality of individual parallel data busses, further comprising instructions to:

forward a plurality of data bytes comprising a packet over the plurality of links together and in parallel, with any unused data bytes in a packet being replaced with idle control characters.

\* \* \* \* \*